Figure 1:
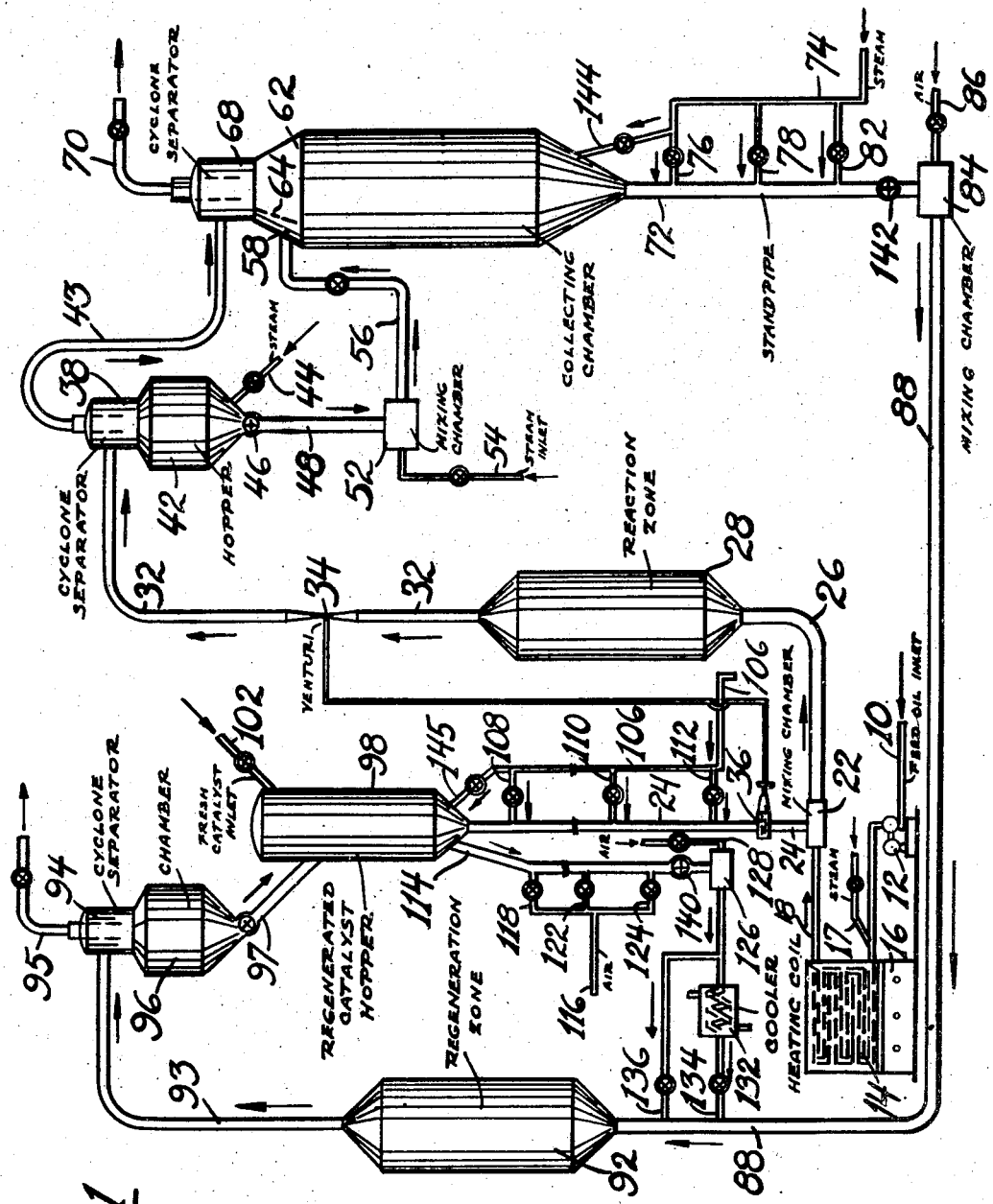

July 15, 1947.  D. L. CAMPBELL  2,424,147
CONTROLLING CATALYST-OIL RATIO BY USE OF A VENTURI
Filed May 9, 1941  3 Sheets-Sheet 3

Donald L. Campbell Inventor
By  JCAnnell  Attorney

Patented July 15, 1947

2,424,147

UNITED STATES PATENT OFFICE 2,424,147

CONTROLLING CATALYST-OIL RATIO BY USE OF A VENTURI

Donald L. Campbell, Short Hills, N. J., assignor to Standard Oil Development Company, a corporation of Delaware Application May 9, 1941, Serial No. 392,606

1 Claim. (Cl. 196—52)

This invention relates to catalytic conversions of hydrocarbons, wherein powdered catalysts are used and more particularly relates to controlling the ratio of catalyst to hydrocarbon oil to be converted.

According to this invention, powdered catalyst from a catalyst hopper is fed into a standpipe, and gas such as steam or the like is introduced into the standpipe at various points to aerate the catalyst mass and to maintain it in a fluidized condition so that it takes on the properties of a fluid. The standpipe of fluidized catalyst provides a head of pressure which is utilized to force the catalyst into a mixing chamber in a pipe where it mixes with a flowing stream of hydrocarbons in vapor form at a controlled rate and with or without steam and the suspension of catalyst in the hydrocarbon vapors is then passed through a reaction zone.

The reaction zone is of a larger diameter than the inlet pipe which feeds the mixture to the reaction zone and due to the low velocity of the mixture through the zone, there is a slippage between the catalyst particles and the hydrocarbon vapors and the vapors pass through the reaction zone at a higher velocity than the catalyst particles. However, the velocity of the mixture through the reaction zone is sufficiently high to prevent settling of the catalyst particles on the floor of the reaction zone.

The reaction products and catalyst particles leave the reaction zone through an outlet pipe and are passed to a separating means for separating catalyst particles from reaction products in vapor form. This outlet pipe is provided with a venturi associated with control means to control the amount of catalyst leaving the standpipe and being introduced into the mixing chamber above described. The catalyst particles mixed with the reaction products act like a fluid and variation of the amount of catalyst in the vapors will change the density of the mixture passing through the venturi. The static pressure differential through the venturi with a given velocity will vary as the concentration of the catalyst in the vapors varies. The control is so set that if the static pressure differential falls below a certain figure more catalyst will be introduced from the bottom of the standpipe into the mixing chamber. Instead of placing the venturi in the outlet line from the reactor, it may be placed ahead of the reactor or in the inlet end of the reactor.

The catalyst particles separated from the reaction products in vapor form have carbonaceous deposits which reduce the activity of the catalyst and it is desirable to regenerate the catalyst particles. The separated catalyst particles are introduced into another standpipe which is aerated by the introduction of steam or other suitable gas into the standpipe at spaced points. The suspension of fouled catalyst particles is passed with air through a regeneration zone where the carbonaceous material is burnt off from the catalyst particles and the regenerated catalyst particles are then introduced into the catalyst hopper for introduction into the first standpipe above described.

Figure 2:
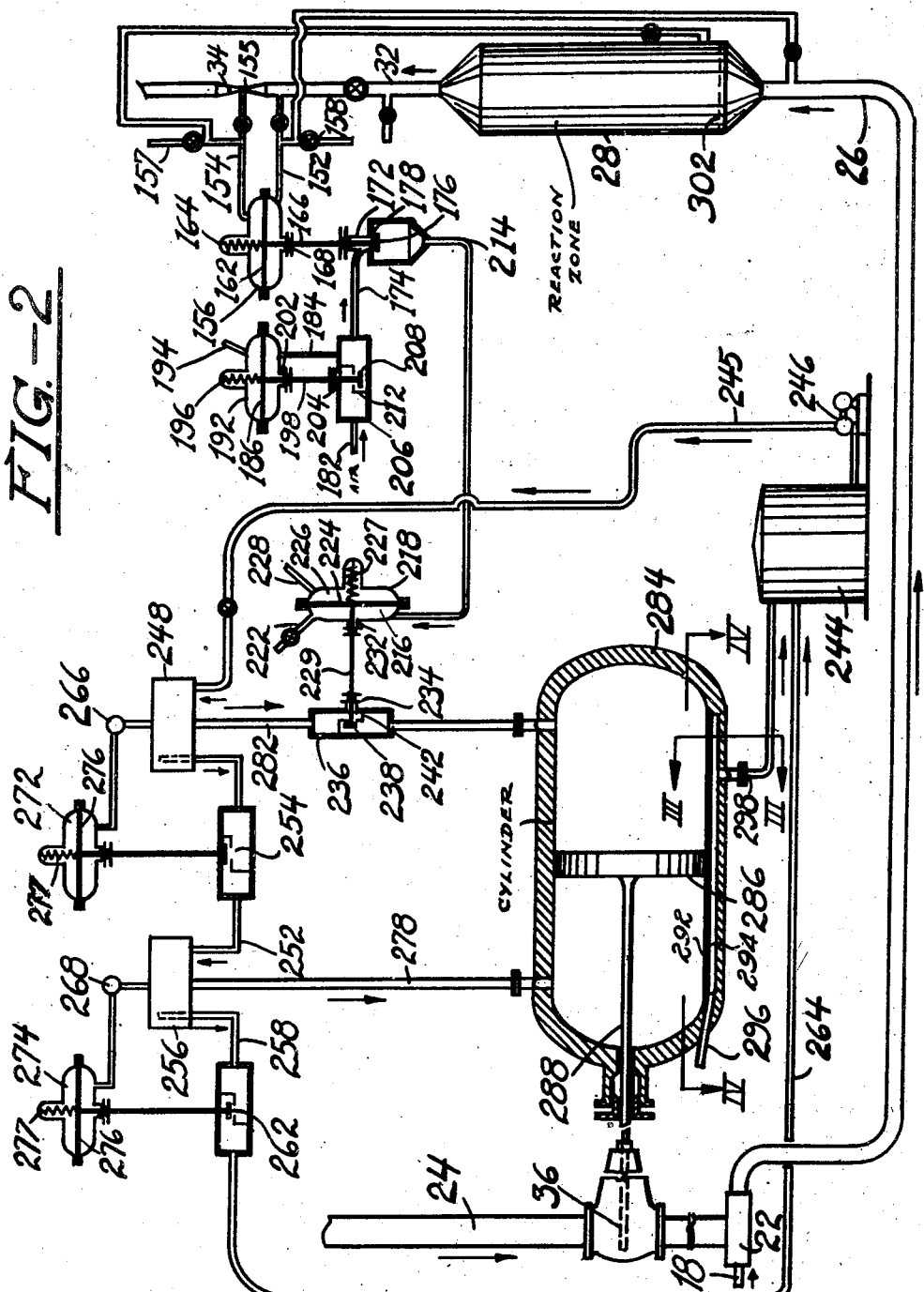
Figure 3:
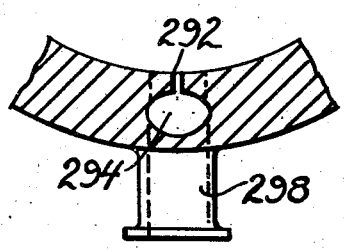
Figure 4:
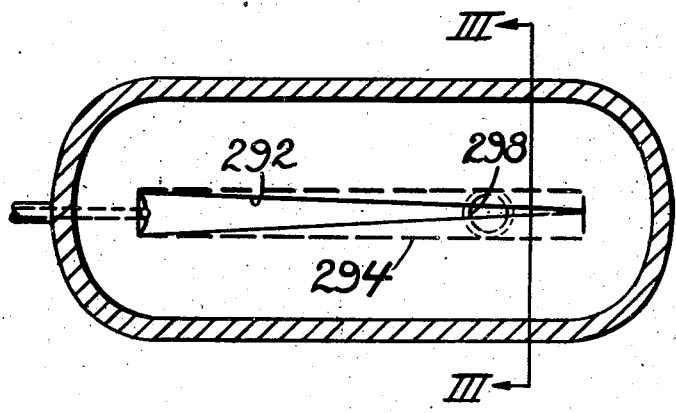

In the drawing:

Figure 1 represents one form of apparatus for carrying out my invention;

Figure 2 diagrammatically represents the control means associated with the venturi for controlling the catalyst-oil ratio;

Figure 3 represents a detail in vertical cross section taken substantially on line III—III of the cylinder in Figure 2; and Figure 4 represents a horizontal cross section taken on line IV—IV of the cylinder to show the slot in the bottom of the cylinder.

It is to be understood that the invention is not to be restricted to the apparatus shown as other forms of apparatus may be used.

Referring now to the drawing, the reference character 10 designates a line through which hydrocarbon oil to be converted is passed by means of pump 12 at a controlled rate. The hydrocarbon oil may be any usual cracking stock such as gas oil, or the like. The hydrocarbon oil is passed through a heating coil 14 in the heater 16 to substantially completely vaporize the oil and to raise it to the desired temperature. Steam may be added at a controlled rate as, for example, through line 17 to aid in vaporization of the oil.

The oil vapors with or without steam are passed through line 18 and mixed in chamber or zone 22 with powdered catalyst introduced from the standpipe 24. The powdered catalyst is maintained in a fluidized condition in the standpipe 24 as will be hereinafter described in greater detail. The powdered catalyst is preferably of particles of a size between 1 and 150 microns and may comprise any suitable cracking catalyst such as natural or acid treated clays, synthetic clays, synthetic gels containing silica and alumina or synthetic gels containing silica and magnesia, or the like.

The mixture of oil vapors and catalyst at a conversion temperature is passed through line 26 and into the bottom of reaction zone 28. The reaction zone is an enlarged chamber having a diameter much greater than the diameter of the pipe 26. The velocity of the stream through the reaction zone and through the system is relatively low so that the pressure drop through the system is small. Due to the relatively low velocity, the hydrocarbon vapors pass through the reaction zone at a greater rate than the catalyst particles and there is a higher concentration of catalyst in oil vapors in the reaction zone. At the same time, the vapors and catalyst particles are maintained in a turbulent condition so that the temperature in the reaction zone is substantially uniform throughout the entire zone. While the velocity permits concentration of the catalyst particles in the reaction zone, it is to be noted that the velocity is sufficiently high to prevent settling of the catalyst particles on the floor of the reaction zone.

The reaction products and the catalyst particles leave the top of the reaction zone 28 through line 32 provided with a venturi 34 and are passed to a separating means 38 which is shown in the drawing as a cyclone separator for separating catalyst particles from reaction products in vapor form.

The venturi 34 comprises a control means which is associated with the valve 36 at the bottom of the standpipe 24 to control the amount of catalyst being introduced into the mixing chamber 22 from the standpipe 24. The venturi and associated parts will be described in greater detail hereinafter.

In the separating means 38 catalyst particles are separated from vapors, the catalyst particles dropping into a hopper 42 and the vapors passing overhead through line 43. Steam may be introduced into the bottom portion of the hopper 42 by means of line 44. The catalyst particles after having passed through the reaction zone 28 are coated with carbonaceous deposits which reduce the activity of the catalyst particles and it is desirable to remove these carbonaceous deposits and regenerate the catalyst particles. In some instances the catalyst particles may be returned to standpipe 24 for recycling in the process without regeneration.

The catalyst particles are withdrawn from the bottom of the hopper by means of a star feeder 46 and are passed through line 48 to a mixing chamber 52 where they are suspended in a gaseous fluid such as steam introduced into the mixing chamber 52 by means of line 54. The suspension of fouled catalyst particles in steam or the like is passed through line 56 and introduced into the upper part of a collecting chamber 62. The collecting chamber 62 is provided with a baffle 64 which functions to separate catalyst particles from the gaseous carrier, the catalyst particles dropping into the lower part of the chamber 62.

The reaction products in vapor form leaving the separating means 38 through line 43 are introduced into a second separating means 68 which is shown as a cyclone separator for separating additional amounts of catalyst particles from the reaction products in vapor form. Separating means 68 form the upper part of collecting chamber 62. The separated catalyst particles drop into the collecting chamber 62. The separated reaction products pass overhead through line 70 and are further treated in any suitable manner such as in a fractionating system to separate desired products including gasoline from the reaction products.

The catalyst particles in the lower part of the collecting chamber 62 are introduced into a second standpipe 72 which communicates with the bottom of the chamber 62. In order to aerate the mass of fouled catalyst particles, steam or other suitable gas is introduced into the standpipe 72 by means of manifold 74 and spaced branch lines 76, 78 and 82.

The aerated catalyst particles are introduced into a mixing chamber 84 where they are mixed with air or other oxidizing agents introduced by means of line 86. The suspension of catalyst particles in the oxidizing agent is passed through line 88 and introduced into the bottom of a regeneration zone 92. The regeneration zone is an enlarged chamber which is similar in construction to the reaction zone 28. Due to the relatively low velocity of the stream through the chamber there is a slippage between the regenerating gases and the catalyst particles and the regenerating gases pass through the regeneration zone at a faster velocity than the catalyst particles. However, the velocity of the stream through the reaction zone is sufficient to prevent settling of the catalyst particles on the floor of the regeneration zone. It is important to control the temperature of the catalyst particles during regeneration and the control of this temperature will be presently described.

The regenerated catalyst particles and regenerating gases leave the regeneration zone through line 93 and are introduced into a separating means 94 which is shown as a cyclone separator for separating catalyst particles from regenerating gases. The regenerating gases pass overhead through line 95 and the separated catalyst particles are collected in a chamber 96. The regenerating gases leaving the separating means through line 95 still contain appreciable amounts of catalyst particles and if desired, a secondary and tertiary separating means may be used. Also an electrical precipitator may be used.

The separated regenerated catalyst particles leave the bottom of the chamber 96 through line 97 and are introduced into a catalyst hopper 98. Fresh catalyst may be introduced into the catalyst hopper 98 by means of line 102. The regenerated catalyst particles together with any added fresh catalyst particles are introduced into the upper part of the standpipe 24 which communicates with the bottom portion of the hopper 98. In order to maintain the catalyst particles in fluidized condition, any suitable gas such as steam, or the like is introduced into the standpipe 24. The gas is introduced into manifold 106 which communicates with branch lines 108, 110 and 112 for introducing the fluidizing medium into the catalyst mass in the standpipe at spaced points along the length of the standpipe.

Returning now to the regeneration zone, the method of controlling the temperature during regeneration will be described. A third standpipe 114 is shown as communicating with the bottom of the catalyst hopper 98. Regenerated catalyst particles from the hopper 98 are also introduced into the standpipe 114. The catalyst particles in the standpipe 114 are maintained in a fluidized condition by introducing a gaseous medium such as air into the catalyst mass in the standpipe 114. The gaseous medium is introduced into a manifold 116 provided with branch lines 118, 122 and 124 for introducing the gaseous medium into the standpipe 114 at spaced points along the length of the standpipe.

The regenerated catalyst in fluidized condition from standpipe 114 is introduced into a mixing chamber 126 where it is further mixed with air or other oxidizing medium introduced into the mixing chamber by means of line 128. The catalyst particles from the mixing chamber 126 are passed through a cooler 132 for reducing their temperature and they are then passed through line 134 and introduced into the regeneration zone 92 along with fouled catalyst from line 88. In this way the temperature of the catalyst particles in the regeneration zone is controlled and is prevented from rising above about 1200° F. A bypass line, 136, is provided to control the temperature of the stream entering regeneration zone 92.

If the fouled catalyst particles passing through line 88 are at too low a temperature, hot regenerated catalyst particles from the mixing chamber 126 are by-passed around the cooler 132, passed through line 136 and mixed with the fouled catalyst particles passing through line 88 before they are introduced into the regeneration zone 92.

Slide valves 140, 36 and 142 are provided for the bottom of the standpipes 114, 24 and 72, respectively, for control purposes. The catalyst particles collected in hoppers 62 and 98 are preferably aerated or fluidized as shown by extensions 144 and 145 of lines 74 and 106, respectively.

As above pointed out, for a given velocity the static pressure differential for a gas passing through a venturi will vary with the density of the gas. According to this invention, gases and solid particles are passed through the system but since the mixture or suspension of catalyst particles in a gaseous carrier assumes the characteristics of a fluid or gas, with a given concentration of catalyst particles in a gas, the fluid stream will have a certain density and this will give a certain static pressure differential through the venturi 34. If the concentration of the catalyst particles varies in the gaseous carrier during the process for any reason, the density of the stream will also vary and the static pressure differential through the venturi 34 will vary. This variation causes operation of the valve at the bottom of standpipe 24 to control the amount of catalyst being introduced into mixing chamber 22.

According to my invention, the Venturi control is set for a desired ratio of weight rates of flow of catalyst particles to oil and variations from this selected ratio are compensated for by the controlling means associated with the venturi 34. The mechanism whereby the venturi 34 controls the amount of catalyst introduced into the mixing chamber 22 from the standpipe 24 will now be described.

As shown in Figure 2 of the drawing, the line 152 connects with the pipe 32 leaving the reaction zone 28 preferably at least one-half pipe diameter preceding the mouth of the inlet section of the venturi 34, and the line 154 connects with the venturi 34 at the reduced or throat position 155 at the minimum cross-sectional area. As the catalyst particles and vapors or gases pass through the pipe 32 and through the venturi 34, there is a static pressure differential created due to the restricted area of the throat 155 in the venturi. This static pressure differential varies with the density of the suspension passing through the venturi and its velocity. The static pressure differential caused by the venturi is used to actuate a diaphragm-operated valve 156 through lines 152 and 154. In order to prevent catalyst particles from entering and plugging the lines 152 and 154, bleed lines 157 and 158 are provided for bleeding in a small amount of gas so as to insure that at all times there is a flow of gas from line 154 into Venturi throat 155 and from line 152 into line 32. This flow is maintained at so low a rate in each case, as compared with the diameter of the lines 154 and 152 in question, that the respective pressures in lines 154 and 152 are substantially constant throughout their lengths.

A change in the static pressure differential between line 32 and throat 155 causes a change in the pressure differential across the diaphragm 162. An increase in the above-mentioned pressure differential causes this diaphragm to move upward against a spring 164 and thus lifts a valve stem 166 which is secured to the diaphragm 162 and which extends through stuffing boxes 168 and 172 into and through line 174 and terminates in a valve disc 176 which seats against valve seat 178. Thus, the increase in the above-mentioned pressure differential causes disc 176 to approach seat 178 and tends to reduce the flow in line 174.

Air is supplied to line 174 from any suitable source of compressed air through line 182. The pressure of the air in line 174 is regulated as follows: Line 174 is connected by line 184 to the space under a diaphragm 186 of a diaphragm operated valve 192, the space above the diaphragm being open to the air through line 194. The pressure in line 174 is used to push the diaphragm 186 upward against the resisting force of spring 196 and to thereby lift valve stem 198 which is secured to the under side of diaphragm 186 and extends downward therefrom through stuffing boxes 202 and 204 into reducing valve 206 where it terminates in a valve disc 208 which closes against valve seat 212. As will be seen from the drawing, an increase in pressure in line 174 tends to shut the valve 206 and thereby decrease the flow from line 182 into line 174. By this means it is possible to maintain a constant air pressure in line 174 even though the air pressure in the source line 182 is somewhat variable.

Since the air pressure in line 174 is substantially constant and since it has been shown that an increase in the static pressure differential across the venturi tends to close the valve disc 196 against the valve seat 178, it is evident that an increased Venturi static pressure differential tends to decrease the flow in line 214 extending beyond valve seat 178, but this line is connected to a chamber 216 of a diaphragm operated valve 218, the chamber 216 having a restricted opening 222 to the atmosphere so that decreasing this flow tends to decrease the pressure in line 214 and in chamber 216. Chamber 216 is to the left of diaphragm 224, and to the right of the diaphragm is a chamber 226 open to the atmosphere through line 228. A decrease in the pressure in the left chamber 216 tends to cause the diaphragm 224 to move to the left because the force tending to compress the diaphragm 224 against the spring 227 is reduced. The leftward movement of the diaphragm 224 causes a leftward movement of the valve stem 229 secured to the left side of diaphragm 224 and which extends through stuffing boxes 232 and 234 into valve 236 and terminates in valve disc 238 which seats against valve seat 242. This leftward movement of the valve seat tends to open the valve 236.

Oil or water is stored in an atmospheric reservoir 244 and is pumped from this reservoir through line 245 by an ordinary centrifugal pump 246 through a high pressure chamber 248, line 252 having a pressure reducing valve 254 for regulating the pressure in the chamber 248, a medium pressure chamber 256, line 258 having a pressure reducing valve 262 for regulating the pressure in the medium pressure chamber 256 and through line 264 back to the atmospheric reservoir 244. Each of the chambers is equipped with an air chamber 266 and 268. The pressure reducing valves may be as indicated, diaphragm-operated valves 272 and 274 similar in construction to the diaphragm-operated valves above described and including diaphragm 276, and springs 277 for operating the valves. The diaphragm-operated valves are set for the desired pressures and higher pressures will open valves 254 and 262 to maintain the desired pressures in the chambers 248 and 256.

Each valve is, of course, arranged so that an increase in the pressure in the preceding chamber tends to open the valve. The two chambers are connected through lines 278 and 282, respectively, to the two opposite ends of a cylinder 284 in which moves a piston 286 attached to stem 288 of valve 36. The medium pressure chamber 256 is connected to the side of the cylinder adjacent to the valve 36 and the connecting line 278 is made sufficiently large so that the pressure at that end of the cylinder 284 is substantially the same as in the medium pressure chamber 256 and is therefore maintained constant.

I will next describe means to temporarily raise the pressure in the other end of the cylinder 284 near line 282 above that in the medium pressure chamber 256 or to lower it below the pressure in the medium pressure chamber and to thereby cause the piston 286 to move in such a direction as to partially close or open, respectively, the valve 36. I will also describe means by equalization of the pressures on the opposite sides of the piston 286 to cause this movement to stop when it has reached a certain desired position.

In the lower part of cylinder 284 there is a slot 292 which opens into a collecting line 294. This collecting line is vented to the air through line 296 and is drained through line or drain 298 to the atmospheric reservoir 244 which is at a lower elevation. It should be noted that the slot 292 as shown in Figure 3 is intended to offer a restriction to the flow of oil or water from the cylinder 284 to the atmospheric reservoir 244 and that once the liquid has passed through this restriction or slot it is collected in the line 294 which is large enough and well enough vented so that line 294 will not run full and the pressure at all points on the downstream side of the restriction 292 is atmospheric. The slot 292 may be uniform in width throughout its length but is preferably triangular in shape with the point of the triangle at the end of the cylinder 284 connected to line 282 and the base of the triangle adjacent the other end of the cylinder 284 connected to line 278 so that the width of the slot gradually increases toward the left in Figure 2. Figure 4 diagrammatically shows a plan view of the preferred form of slot 292.

The pressure in the end of cylinder 284 connected to line 278 is maintained substantially constant because of the large size of line 278 and the small flow through line 278 required to supply the flow through the restriction 292 back to reservoir 244. Thus, no matter what the position of the piston 286, that is, no matter how much of the slot 292 is uncovered by the piston 286 on the side of the cylinder 284 connected to line 278, the flow through the restriction 292 on that side of the piston 286 is not sufficient to cause any pressure differential between the medium pressure cylinder 256 and the end of the cylinder 284 connected therewith.

On the other hand, the flow of water or oil from high pressure cylinder 248 through line 282 to the other end of cylinder 284 is restricted by the valve 236. For a given position of the piston 286, partially opening or closing the valve 236 increases or decreases, respectively, the flow through line 282 and since the amount of the slot 292 uncovered on this side of the piston 286 remains constant, this increase or decrease in flow through line 282 causes an increase or decrease, respectively, in the pressure in the adjacent end of the cylinder 284. Thus, if the piston 286 is originally taken to be at rest due to balancing of the pressures on opposite sides thereof, the opening or closing of valve 236 would tend to close or open, respectively, the valve 36.

Now let us suppose that valve 236 has been partially opened to cause movement of the piston 286 in the direction to close valve 36. Then, as this movement of the piston 286 proceeds, more of the slot 292 is uncovered on the side of the cylinder 284 which is connected to the line 282. This increase in the slot area 292 tends to decrease the pressure differential across the slot and thereby decrease the pressure in that end of the cylinder 284. Thus, eventually a condition is reached in which the pressures on both sides of the piston 286 are again equalized, at which time the movement of the piston 286 stops. In order to maintain a maximum differential pressure between the two sides of the piston 286 up to within a short distance from the desired point of stoppage of movement of the piston, it is preferred to use the triangular shape of slot mentioned above.

In order to prevent the valve 36 from banging shut or open, the lines 278 and 282 may be connected to the cylinder 284 within the limits of piston and valve travel, whereas the slot 292 may be extended beyond the limits of piston and valve travel.

Small holes may be provided in the ends of cylinder 284 draining to the atmospheric reservoir 244 to cushion full motion of the piston 286. Emergency connections may be provided, for example, from the high pressure chamber 248 to the high pressure side of cylinder 284 to close the valve 36 rapidly and completely by moving piston 286 to the left in the drawing.

A consideration of the above-described equipment as a whole will show that it can be proportioned in size and designed in detail so that a small change in the static pressure differential in the venturi will produce a large movement of the valve stem 288 and that for every value of the Venturi static pressure differential there will result a certain position of the valve stem 288. Thus, the equipment indicated will insure controlling the flow of catalyst into the mixing zone or chamber 22 so as to maintain within a small variation the density of the material flowing through the venturi 34.

While I have shown certain preferred control and regulating devices, it is to be understood that other controllers and regulators may be used for changing the position of the slide valve 36 in response to changes in static pressure differentials occurring when the fluids passing through line 32 are passed through the venturi 34.

Instead of placing venturi 34 in the outlet line 32 of the reaction zone 28, it is within the contemplation of my invention to place the venturi in other locations. For example, the venturi 34 may be placed in the inlet line 26 ahead of the reactor 28. In this location the venturi will measure the static pressure differential for the vapors and catalyst before any substantial amount of cracking and change in volume occur.

Or a grid as shown at 302 in Figure 2 in the bottom portion of the reaction chamber 28 may be used and the static pressure differential through grid 302 used for controlling the amount of catalyst delivered to mixing chamber 22 from standpipe 24. In the event that the grid 302 is used as a means to create a static pressure differential, the venturi 34 is dispensed with and line 152 is connected with the reactor 28 below grid 302 and line 154 is connected with the reactor 28 just above grid 302.

The invention will now be more specifically described in connection with catalytic cracking of hydrocarbons. A gas oil having an A. P. I. gravity of 26.7° is vaporized and passed together with 1.5 lbs. of distillation steam per barrel through line 18. The catalyst to be used is preferably an acid treated bentonite clay, which is finely divided into particles of a size between 1 and 150 microns. The catalyst is fluidized in standpipe 24.

The valve 36 is opened to give a catalyst-oil ratio of rates of flow of about 4 to 1 by weight. The temperature of the catalyst-oil suspension in line 32 leaving the reactor 28 is about 925° F., the pressure is about 11 lbs. per sq. in. gauge and the velocity is about 32 feet per second. The velocity in the throat of the venturi is about 138 feet per second. With the control means set for this catalyst-oil ratio and with normal operation there will be no changes or adjustments necessary in the control means. The static pressure differential at the venturi is about 1 pound per square inch.

However, if the catalyst-oil ratio is changed for any reason the automatic means comes into play to readjust the ratio to the original figure. For example, if less catalyst is delivered per weight of oil vapors to mixing chamber 22, the density of the suspension in line 26, reactor 28 and line 32 will be less and the static pressure differential at the venturi 34 will be less. This lessened pressure differential will be transmitted and translated by the control means to cause movement of the piston 286 and valve 36 to the right in Figure 2 and deliver more catalyst to the mixing chamber 22. This will increase the density of the stream flowing through line 26, reactor 28 and line 32 so that the static pressure drop through the venturi is again 1 pound per square inch and the ratio of catalyst to oil will be automatically maintained.

If too much catalyst is being introduced into mixing chamber 22, the static pressure differential through venturi 34 will increase beyond the desired figure and the control means will function to lower the static pressure differential to the desired figure to correspond to the desired catalyst-oil ratio by weight.

It should be noted that the size of catalyst particles used affects the static pressure differential of the venturi and that calibration is desirable in order to measure accurately the ratio of weight rates of flow of catalyst and oil. However, for control purposes the ratio of weight rates of flow of catalyst and oil need not be known accurately. It will be found by trial and error that a certain static pressure differential in the venturi is desirable for a certain rate of flow of oil feed to the unit (with a fixed proportion of steam).

My invention may be used for catalytic cracking of hydrocarbons, catalytic polymerization of hydrocarbons, catalytic dehydrogenation, aromatization, alkylation and other catalytic conversions of hydrocarbons where a suspension of catalyst particles is used in a hydrocarbon gas or vapor.

While a specific example of the preferred form of the invention has been given with respect to catalytic cracking, it is to be understood that this example is by way of illustration only and my invention is not to be restricted thereto as modifications and changes may be made without departing from the spirit of my invention.

In particular my invention may be used for catalytic reactions carried out in apparatus other than the preferred form above-described. As regards the reactor provided, whereas the preferred form of the reactor is of larger diameter than the inlet pipe which feeds the mixture to the reaction zone, it is possible in certain cases to use a reactor no larger in diameter than the inlet pipe. Such a reactor may be relatively long and may be arranged, for example, in the form of a spiral coil or successive vertical or horizontal runs of pipe connected by U bends.

Also, although in the preferred form of the invention a standpipe of fluidized catalyst is used to provide the head of pressure required to force the catalyst into the mixing chamber before the reactor, as an alternative the catalyst may be charged through a lock hopper system into a chamber with a bottom outlet leading through a relatively short length of line to the catalyst feed control valve. By means of suitable arrangements known in the art, gas pressure may be imposed upon the hopper system sufficient to cause the catalyst to flow downward through the outlet and through the catalyst feed control valve into the above-mentioned mixing chamber.

I claim:

A method of catalytically converting hydrocarbons which includes maintaining a desired powdered catalyst to oil ratio which comprises delivering powdered catalyst to a mixing zone as a fluidized stream from a standpipe, mixing a hydrocarbon vapor stream with the stream of powdered catalyst in said mixing zone, passing the mixed stream as a suspension through a combination of a restriction and a reaction zone in series and then a separating zone to separate reaction products from catalyst and controlling the rate of fluidized catalyst delivery to said mixing zone by a valve in said standpipe which valve is in turn controlled by the static pressure differential through said restriction.

DONALD L. CAMPBELL.

REFERENCES CITED

The following references are of record in the file of this patent:

UNITED STATES PATENTS

| Number | Name | Date |
| --- | --- | --- |
| 1,250,319 | Keith | Dec. 18, 1917 |
| 1,541,848 | Raymond | June 16, 1925 |
| 1,677,691 | Smith | July 17, 1928 |
| 1,944,243 | Kegl et al. | Jan. 23, 1934 |
| 2,231,231 | Subkow | Feb. 11, 1941 |
| 2,248,196 | Plummer | July 8, 1941 |
| 2,217,634 | Rude | Oct. 8, 1940 |
| 2,271,148 | Becker et al. | Jan. 27, 1942 |
| 2,296,386 | Hemminger | Sept. 22, 1942 |
| 2,302,209 | Goddin, Jr. | Nov. 17, 1942 |
| 2,326,705 | Thiele et al. | Aug. 10, 1943 |